(12) United States Patent
Sala et al.

(10) Patent No.: US 11,309,589 B1
(45) Date of Patent: Apr. 19, 2022

(54) MOTION-GENERATING PUMPS FOR DESULFATION OF LEAD-ACID BATTERIES

(71) Applicant: GM GLOBAL TECHNOLOGY OPERATIONS LLC, Detroit, MI (US)

(72) Inventors: Dorel M. Sala, Troy, MI (US); Mahmoud Abd Elhamid, Troy, MI (US); Dave G. Rich, Sterling Heights, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 0 days.

(21) Appl. No.: 17/119,858

(22) Filed: Dec. 11, 2020

(51) Int. Cl.
*H01M 10/00* (2006.01)
*H01M 10/42* (2006.01)
*H01M 10/06* (2006.01)

(52) U.S. Cl.
CPC ....... *H01M 10/4242* (2013.01); *H01M 10/06* (2013.01); *H01M 10/4214* (2013.01)

(58) Field of Classification Search
CPC .......... H01M 2/38; H01M 2/36; H01M 10/02; H01M 10/50; H01M 2/02
See application file for complete search history.

(56) References Cited

U.S. PATENT DOCUMENTS

| 4,308,322 A * | 12/1981 | Hammar | H01M 50/70 |
| | | | 429/53 |
| 4,565,748 A * | 1/1986 | Dahl | F04D 33/00 |
| | | | 429/10 |
| 2012/0308867 A1 | 12/2012 | Winter | |
| 2013/0011702 A1* | 1/2013 | Horne | B60L 50/64 |
| | | | 429/51 |
| 2017/0306943 A1* | 10/2017 | Hays | F04B 43/09 |

* cited by examiner

*Primary Examiner* — Cynthia H Kelly
*Assistant Examiner* — Monique M Wills
(74) *Attorney, Agent, or Firm* — Harness, Dickey & Pierce, P.L.C.

(57) ABSTRACT

The present disclosure pertains to motion-generating pumps, energy storage devices including such motion-generating pumps, and methods of making and using the same for the desulfation of lead-acid batteries. The energy storage device includes a battery casing defining a plurality of chambers, each of the plurality of chambers may include one or more electroactive plates disposed therein and an electrolyte disposed so as to surround the one or more electroactive plates. The energy storage device further includes one or more circulating systems configured to agitate the electrolyte in each of the plurality of chambers. A method for desulfation in a lead-acid battery may include using one or more circulating systems to circulate an electrolyte so as to prevent precipitation.

18 Claims, 3 Drawing Sheets

MOTION-GENERATING PUMPS FOR DESULFATION OF LEAD-ACID BATTERIES

INTRODUCTION

This section provides background information related to the present disclosure which is not necessarily prior art.

The present disclosure pertains to energy storage devices, including devices and methods for the desulfation of lead-acid batteries.

Lead-acid batteries are important sources of energy for a variety of applications, including, for example, various motor vehicles with start/stop function and micro-hybrid motor vehicles. Typical lead-acid batteries include pluralities of alternatively stacked negative and positive plates separated by ion-permeable separators disposed within a battery casing. The battery case contains one or more electrolytes, for example aqueous acid solutions including sulfuric acid. Each plate includes an electrically conductive frame or support (e.g., lead grid lattice) that supports an electroactive material, such as a battery paste comprising lead oxide or lead (e.g. sponge lead).

During battery discharge, electroactive materials react with the sulfuric acid to form lead sulfate. Lead sulfate typically forms in a finely divided, amorphous state (e.g., soft state) that readily reverts during battery recharge. However, as the battery cycles through numerous discharges and charges, in particular when the lead-acid battery is insufficiently charged for a long period of time, a portion of the lead sulfate may precipitate or crystallize on surfaces of the plates (e.g., hard state). The precipitation of the lead sulfate may cause an increase in internal resistance leading to performance deterioration of the battery and, in certain instances, plate cracking.

Common methods for desulfation, such as long duration and pseudorandom pulse charging, often require too much time to be effective and use voltages and frequencies that are incomparable with the use of the lead-acid battery. Other methods for desulfation, including the application and regulation of applied voltages and temperature, often exacerbate corrosion and gassing effects within the lead-acid battery. Accordingly, it would be desirable to develop improved materials and methods for the desulfation of lead-acid batteries.

SUMMARY

This section provides a general summary of the disclosure, and is not a comprehensive disclosure of its full scope or all of its features.

The present technology provides, in various aspects, aspects devices (e.g. energy storage devices) comprising an electroactive structure (e.g., an electrode) and an electrically-conductive solution (e.g., an electrolyte) in fluid communication with a surface of the electroactive structure. In various embodiments, such devices are batteries. The devices comprise a circulating system in fluid communication with the electrically-conductive solution, which is operable to create movement in the electrically-conductive solution. In various aspects, such movement may alter the concentration of ionic species in the electrically-conductive solution in proximity to a surface of the electroactive structure.

In various aspects, the present disclosure provides a method for desulfation in a lead-acid battery. The method may include circulating an electrolyte using one or more circulating systems. The lead-acid battery may include one or more electroactive plates disposed within a casing. The electrolyte may be disposed within the casing so as to surround the electroactive plate(s). The one or more circulating systems may be in communication with the electrolyte.

As referred herein, "surround" means contact of the electrolyte (or other reactive or electrically-conductive solution). In various embodiments, the electrolyte may substantially cover one or more surfaces of the electroactive plate. In some aspects, the electrolyte may cover substantially all surfaces of the electroactive plate.

In one aspect, at least one outlet tube carries the electrolyte from the lead-acid battery to the one or more circulating systems and at least one inlet tube carries the electrolyte from the one or more circulating systems to the lead-acid battery.

In one aspect, the one or more circulating systems may be disposed within the casing with the one or more electroactive plates.

In one aspect, the one or more circulating systems may include one or more peristaltic pumps. The one or more peristaltic pumps may include at least one moving member and at least one pump tube.

In one aspect, the at least one pump tube may be in communication with the at least one outlet tube and the at least one inlet tube. Movement of the at least one moving member may press the at least one pump tube so as to carry the electrolyte from the inlet tube to the outlet tube.

In one aspect, the at least one outlet tube, the inlet tube, and the pump tube may include polytetrafluoroethylene (PTFE).

In one aspect, the one or more circulating systems may be electrically powered.

In one aspect, the one or more circulating systems may be pneumatically powered.

In one aspect, the lead-acid battery may further include a control module. The control module may be configured to actuate the one or more circulating systems for one of a predetermined number of circulation cycles and a first predetermined time period. Following the actuation and elapse of the first predetermined number of circulation cycles or the first predetermined time period, the control module may be configured to maintain the one or more circulating systems in a non-motion state for a second predetermined time period.

In various other aspects, the present disclosure provides an energy storage device including a battery casing and one or more circulating systems in communication with the battery casing. The battery casing may define a plurality of chambers and each of the plurality of chambers may include one or more electroactive plates disposed therein and an electrolyte disposed so as to surround the one or more electroactive plates. The one or more circulating systems may be configured to agitate the electrolyte in each of the plurality of chambers In one aspect, a first circulating system may be configured to agitate the electrolyte in a first chamber of the plurality of chambers and a second circulating system may be configured to agitate the electrolyte in a second chamber of the plurality of chambers.

In one aspect, a first circulating system may be configured to agitate the electrolyte in both the first chamber of the plurality of chambers and the electrolyte in a second chamber of the plurality of chambers.

In one aspect, the electrolyte in the first chamber of the plurality of chambers may be the same as the electrolyte in the second chamber of the plurality of chambers.

In one aspect, the electrolyte in the first chamber of the plurality of chambers may be different from the electrolyte in the second chamber of the plurality of chambers.

In one aspect, the one or more circulating system are disposed within the battery casing.

In one aspect, the energy storage device may further include at least one outlet tube that carries electrolyte from the battery casing to the one or more circulating systems and at least one inlet tube that carries electrolyte from the one or more circulating systems to the battery casing.

In one aspect, the one or more circulating systems may include one or more peristaltic pumps. The one or more peristaltic pumps may include at least one moving member and at least one pump tube.

In one aspect, the at least one pump tube may be in communication with the at least one outlet tube and the at least one inlet tube. Movement of the at least one moving member may press the at least one pump tube so as to carry the electrolyte from the inlet tube to the outlet tube.

In one aspect, the at least one outlet tube, the inlet tube, and the pump tube may include polytetrafluoroethylene (PTFE).

In one aspect, the one or more circulating systems may be electrically powered.

In one aspect, the one or more circulating systems may be pneumatically powered.

In one aspect, the energy storage device may further include a control module. The control module may be configured to actuate the one or more circulating systems for one of a predetermined number of circulation cycles and a first predetermined time period. Following the actuation and elapse of the first predetermined number of circulation cycles or the first predetermined time period, the control module may be configured to maintain the one or more circulating systems in a non-motion state for a second predetermined time period.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Example embodiments are provided so that this disclosure will be thorough, and will fully convey the scope to those who are skilled in the art. Numerous specific details are set forth, such as examples of specific compositions, components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, elements, compositions, steps, integers, operations, and/or components, but do not preclude the presence or addition of one or more other features, integers, steps, operations, elements, components, and/or groups thereof. Although the open-ended term "comprising," is to be understood as a non-restrictive term used to describe and claim various embodiments set forth herein, in certain aspects, the term may alternatively be understood to instead be a more limiting and restrictive term, such as "consisting of" or "consisting essentially of." Thus, for any given embodiment reciting compositions, materials, components, elements, features, integers, operations, and/or process steps, the present disclosure also specifically includes embodiments consisting of, or consisting essentially of, such recited compositions, materials, components, elements, features, integers, operations, and/or process steps. In the case of "consisting of," the alternative embodiment excludes any additional compositions, materials, components, elements, features, integers, operations, and/or process steps, while in the case of "consisting essentially of," any additional compositions, materials, components, elements, features, integers, operations, and/or process steps that materially affect the basic and novel characteristics are excluded from such an embodiment, but any compositions, materials, components, elements, features, integers, operations, and/or process steps that do not materially affect the basic and novel characteristics can be included in the embodiment.

Any method steps, processes, and operations described herein are not to be construed as necessarily requiring their performance in the particular order discussed or illustrated, unless specifically identified as an order of performance. It is also to be understood that additional or alternative steps may be employed, unless otherwise indicated.

When a component, element, or layer is referred to as being "on," "engaged to," "connected to," or "coupled to" another element or layer, it may be directly on, engaged, connected or coupled to the other component, element, or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various steps, elements, components, regions, layers, and/or sections, these steps, elements, components, regions, layers and/or sections should not be limited by these terms, unless otherwise indicated. These terms may be only used to distinguish one step, element, component, region, layer or section from another step, element, component, region, layer or section. Terms such as "first," "second," and other numerical terms when used herein do not imply a sequence or order unless clearly indicated by the context. Thus, a first step, element, component, region, layer, or section discussed below could be termed a second step, element, component, region, layer, or section without departing from the teachings of the example embodiments.

Spatially or temporally relative terms, such as "before," "after," "inner," "outer," "beneath," "below," "lower," "above," "upper," and the like, may be used herein for ease of description to describe one element or feature's relationship to another element(s) or feature(s) as illustrated in the figures. Spatially or temporally relative terms may be intended to encompass different orientations of the device or system in use or operation in addition to the orientation depicted in the figures.

Throughout this disclosure, the numerical values represent approximate measures or limits to ranges to encompass minor deviations from the given values and embodiments having about the value mentioned as well as those having exactly the value mentioned. Other than in the working examples provided at the end of the detailed description, all numerical values of parameters (e.g., of quantities or conditions) in this specification, including the appended claims, are to be understood as being modified in all instances by the term "about" whether or not "about" actually appears before the numerical value. "About" indicates that the stated numerical value allows some slight imprecision (with some approach to exactness in the value; approximately or reasonably close to the value; nearly). If the imprecision provided by "about" is not otherwise understood in the art with this ordinary meaning, then "about" as used herein indicates at least variations that may arise from ordinary methods of measuring and using such parameters. For example, "about" may comprise a variation of less than or equal to 5%, optionally less than or equal to 4%, optionally less than or equal to 3%, optionally less than or equal to 2%, optionally less than or equal to 1%, optionally less than or equal to 0.5%, and in certain aspects, optionally less than or equal to 0.1%.

In addition, disclosure of ranges includes disclosure of all values and further divided ranges within the entire range, including endpoints and sub-ranges given for the ranges.

Example embodiments will now be described more fully with reference to the accompanying drawings.

Though the following discussion is directed to lead-acid batteries and, in particular, desulfation of lead-acid batteries, the skilled artisan will appreciate that the present teachings may be similarly applied in the instance of various other energy devices or batteries, for example, such as lithium-ion batteries. The present disclosure relates generally to motion-generating mechanisms for maintaining substantially homogeneous systems, for example, electrolyte systems of energy storage device.

In general, the present technology pertains generally to devices operable to create motion in fluids that are in fluid communication (contact) with an electroactive surface. In various aspects, the fluid and surface comprise species in a electrochemical reaction, and the devices are operable to alter local concentrations of the species so as to affect the equilibrium of the electrochemical reaction. Such motion may include stirring, agitation, circulation, or other flow of the fluid in contact with the surface (generally referred to as "agitation" herein). In some embodiments, motion may increase the uniformity of concentration of chemical species in the solution, e.g., by homogenizing the distribution of species in the solution. Accordingly, in some embodiments, the present technology provides a device (e.g., a lead-acid battery) comprising: a casing having an interior surface; an active component having a surface (e.g., an electroactive plate) disposed in the casing; a fluid (e.g., electrolyte) disposed within the casing and surrounding the surface of the active component. The device comprises a circulation system, which may, in whole or in part, be disposed in the casing.

For example, the present disclosure provides motion-generating mechanisms useful in electrochemical energy storage devices. In various embodiments, such devices are batteries comprising solutions (e.g., electrolytes) in fluid communication with reactive surfaces (e.g., electrodes). In some embodiments, such batteries are lead-acid batteries, such as flooded, sealed, absorbent glass mat (AGM), gel sealed, and bipolar lead-acid batteries.

As discussed above and further herein, such mechanisms may be internally disposed in lead-acid devices, and are operable to desulfate electrodes. For example, internally disposed motion-generating mechanisms may create wave-like motions so as to agitate an electrolyte within an energy system. Movement of the electrolyte may maintain and, in certain aspects, increase the homogenous nature of the system. For example, as in the instance of lead-acid batteries, movement or circulation of the electrolyte may maintain the solubility of lead sulfates.

In various aspects, a lead-acid battery may include a battery casing that may a plurality of chambers, each of the plurality of chambers may include one or more electroactive plates disposed therein and an electrolyte disposed surrounding the one or more electroactive plates. The lead-acid battery may further include one or more circulating systems configured to agitate the electrolyte. The skilled artisan will recognize that the one or more circulating systems may take a variety of configurations and that a variety of communication paths may exist between the one or more circulating systems and the electrolyte and/or the lead-acid battery. For example, in certain variations, each chamber may be in communication with one of the one or more circulating systems. In further variations, a first circulating system of the one or more circulating systems may be in communication with one or more first chambers of the plurality of chambers. Similarly, a second circulating system of the one or more circulating systems may be in communication with one or more second chambers of the plurality of chambers. In each instance, the one or more circulating systems may be disposed within the battery casing. In other instances, the one or more circulating systems may be external to the battery casing. The skilled artisan will also recognize that, in various instances, the one or more electroactive plates of each chamber of the plurality of chambers may be the same or different from other chambers of the plurality of chambers. Similarly, the skilled artisan will recognize, that in further variations, the electrolyte disposed within each chamber of the plurality of chambers may be the same or different from other chambers of the plurality of chambers.

More specifically, a typical lead-acid battery comprises a plurality of alternatively stacked negative and positive plates separated by ion-permeable separators and/or electrolytes. Often, lead-acid batteries include a plurality of cells electrically connected, for example, in a stack or winding configuration, to increase overall output. A lead-acid battery may include a battery casing having a plurality of cell compartments where one or more cells are disposed. The cells may be electrically connected within and across the multiple compartments. Each separator includes an electrolyte that may, in certain aspects, also be present in the stacked plates, as well as filling at least a portion of a cavity or interior defined by the battery casing, including in the instance of multi-cell batteries segregated cell compartments defined by, for example, integrated walled partitions. Lead-acid batteries operate by a double sulfate chemical reaction. For example, lead and lead dioxide active materials on the batteries plates may react with sulfuric acid in the electrolyte.

Figure 1A:
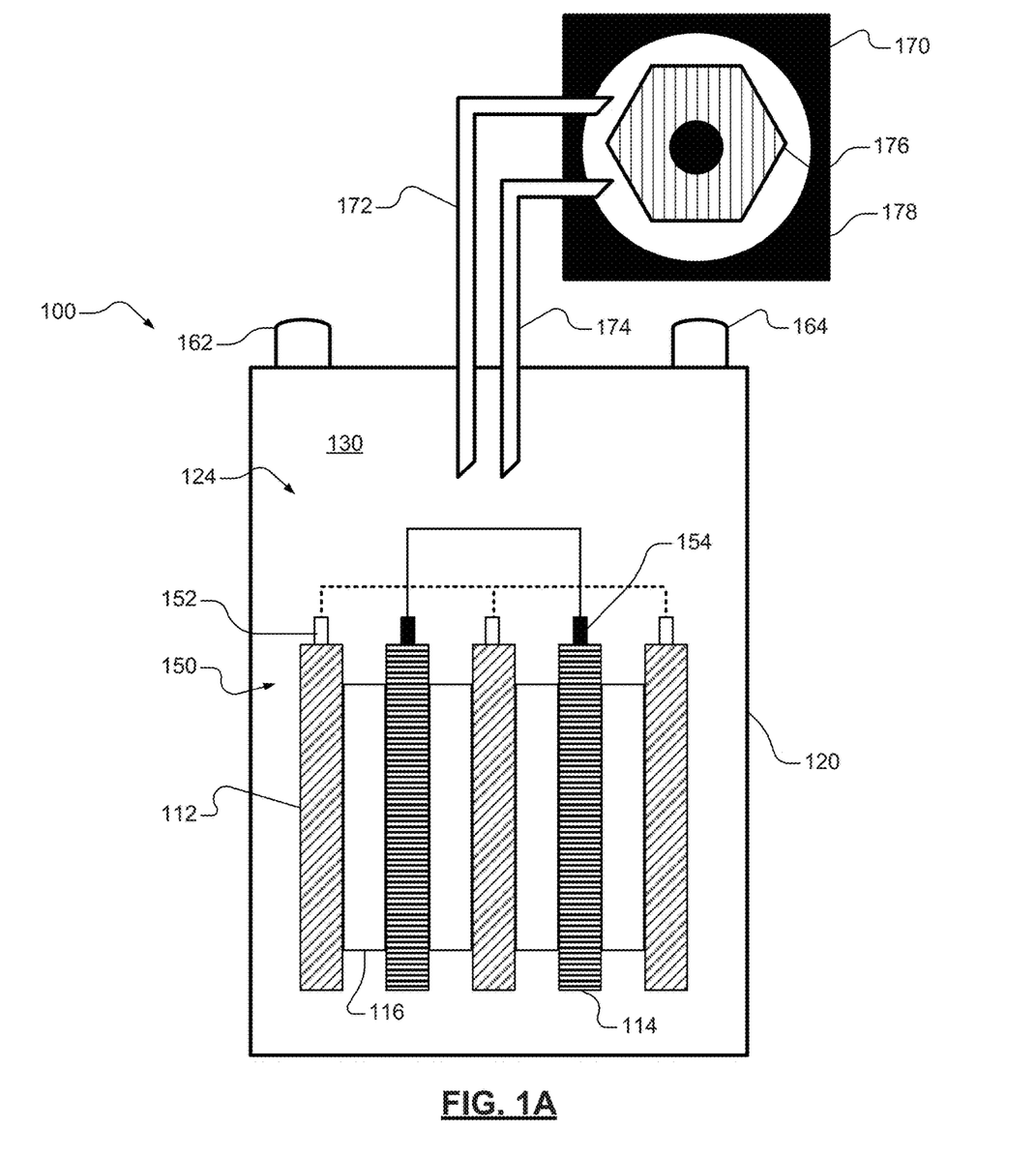
FIG. 1A is an illustration of an example single cell lead-acid battery including a circulating system configured to agitate an electrolyte.

For example, an exemplary and schematic illustration of a single cell lead-acid battery 100 is shown in FIG. 1A. Though a single cell lead-acid battery 100 is illustrated, the skilled artisan will appreciate that the present teachings also apply to various other lead-acid battery configurations, including, for example, lead-acid batteries having two or more individual or distinct electrochemical cells disposed within a single battery housing or casing, as well as battery casings having multiple compartments. The size and shape of a lead-acid battery, including, for example, the number of individual cells, chambers, and/or compartments, as well as the number of plates defining a cell, may vary depending on the particular application for which it is designed. Battery-powered vehicles and hand-held consumer electronic devices, for example, are two examples where batteries would most likely be designed to different size, capacity, and power-output specifications. In certain variations, a 12V lead-acid battery may comprise, for example, six adjacent cells that are electrically connected in serial. The skilled artisan will also recognize that in various aspects lead-acid batteries may include, though not illustrated here, a variety of other components or materials. For instance, lead-acid batteries may include vents, gaskets, and any other conventional component or material.

With renewed reference to FIG. 1A, the illustrated battery 100 includes a plurality of positive plates 112 and a plurality of negative plates 114. The positive and negative plates 112, 114 are in electrical communication and arranged in an alternating stack 150 within a battery housing or casing 120. The battery 100 further includes a plurality of separators 116 that are disposed between the alternating plates 112, 114, also within the battery casing 120. Though the battery casing 120 is illustrated as a singular component, the skilled artisan will appreciate that in various aspects, the battery casing 120 may comprise an opened container having a lid or cover component. In various aspects, the casing 120 is formed from a moldable plastic material comprising, for example, one or more polycarbonates.

The separators 116 provide electrical separation (e.g., prevents physical contact) between the stacked plates 112, 114. The separators 116 also provide a minimal resistance path for internal passage of ions between the plates 112, 114 during battery cycling. The skilled will appreciate that in various aspect separators 116 may be the same or different across the battery 100. For example, in certain aspects, by way of non-limiting example, each separator 116 may be a microporous polymeric separator including, for example, a polyolefin. The polyolefin may be a homopolymer (derived from a single monomer constituent) or a heteropolymer (derived from more than one monomer constituent), which may be either linear or branched. If a heteropolymer is derived from two monomer constituents, the polyolefin may assume any copolymer chain arrangement, including those of a block copolymer or a random copolymer. Similarly, if the polyolefin is a heteropolymer derived from more than two monomer constituents, it may likewise be a block copolymer or a random copolymer. In certain aspects, the polyolefin may be polyethylene, polypropylene, or a blend of polyethylene and polypropylene, or multi-layered structured porous films of polyethylene and/or polypropylene.

Microporous polymeric separators may be single layered or multi-layered laminates, which may be fabricated from either a dry or wet process. For example, in certain instances, a single layer of the polyolefin may form an entire separator 116. In other aspects, a separator 116 may be a fibrous membrane having an abundance of pores extending between the opposing surfaces and may have an average thickness of less than a millimeter, for example. As another example, however, multiple discrete layers of similar or dissimilar polyolefins may be assembled to form a microporous polymer separator.

Each of the separators 116 may also comprise other polymers in addition to the polyolefin such as, but not limited to, polyethylene terephthalate (PET), polyvinylidene fluoride (PVdF), polyamide (nylons), polyurethanes, polycarbonates, polyesters, polyetheretherketones (PEEK), polyethersulfones (PES), polyimides (PI), polyamide-imides, polyethers, polyoxymethylene (e.g., acetal), polybutylene terephthalate, polyethylenenaphthenate, polybutene, polymethylpentene, polyolefin copolymers, acrylonitrile-butadiene styrene copolymers (ABS), polystyrene copolymers, polymethylmethacrylate (PMMA), polysiloxane polymers (e.g., polydimethylsiloxane (PDMS)), polybenzimidazole (PBI), polybenzoxazole (PBO), polyphenylenes, polyarylene ether ketones, polyperfluorocyclobutanes, polyvinylidene fluoride copolymers (e.g., PVdF-hexafluoropropylene or (PVdF-HFP)), and polyvinylidene fluoride terpolymers, polyvinylfluoride, liquid crystalline polymers (e.g., VECTRAN™ (Hoechst AG, Germany) and ZENITE® (DuPont, Wilmington, Del.)), polyaramides, polyphenylene oxide, cellulosic materials, meso-porous silica, or any other material suitable for creating the required porous structure. The polyolefin layer, and any other optional polymer layers, may be further included in each of the separators 116 as fibrous layers so as to help provide the separators 116 with appropriate structural and porosity characteristics. Each separator 116 may also include one or more known wetting agents and/or ionic-conductivity enhancers.

Figure 1B:
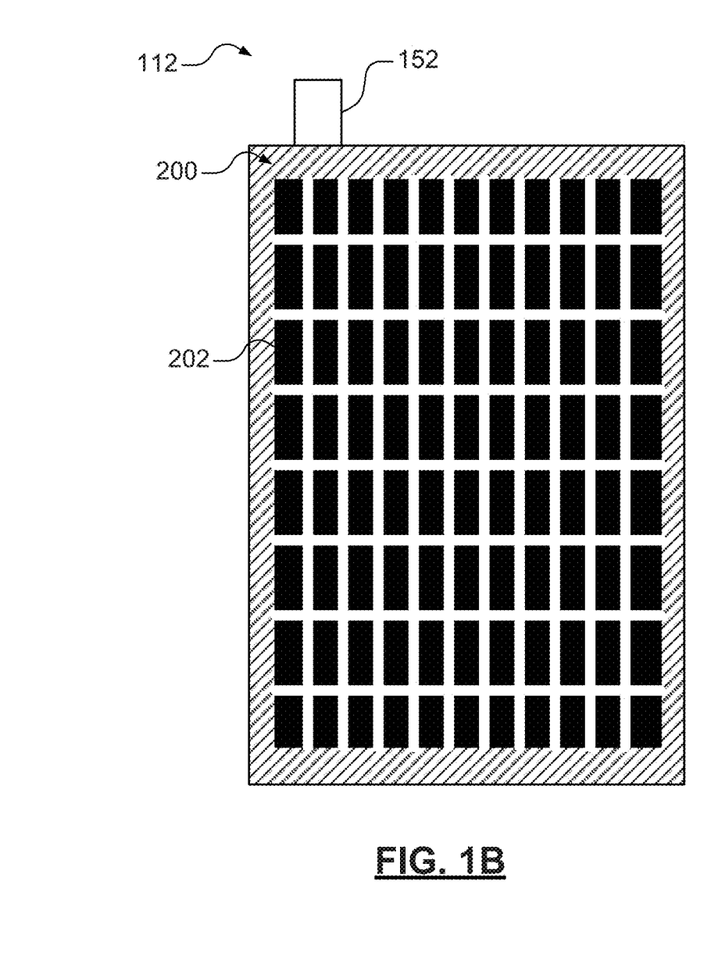
FIG. 1B is an illustration of an example plate for the lead-acid battery illustrated in FIG. 1A.

In various aspects, the positive and negative plates 112, 114 comprise electrically conductive frames or supports that support one or more active materials. For example, as illustrated in FIG. 1B, each positive plate 112 includes a first electrically conductive frame 200 and a first or positive active material 202 disposed thereon. The first electrically conductive frame 200 may be a grid lattice having, for example, a honey-comb structure. As illustrated, the first electrically conductive frame 200 may include a first or positive tab 152. As seen in FIG. 1A, the first tabs 152 of the plurality of positive plates 112 may be electrically connected, and in various aspects, though not shown, the first tabs 152 of the positive plates 112 may be in electrical communication with a first or positive battery terminal 162.

In various aspects, the first electrically conductive frame 200 comprises lead (Pb), and in certain aspects, a lead alloy further comprising one or more additive materials. For example, the first electrically conductive frame 200 may include one or more of antimony (Sb), calcium (Ca), tin (Sn), aluminum (Al), and titanium (Ti). Such additive materials may provide additional mechanical strength to the first electrically conductive frame 200. In various other instances, by way of non-limiting example, the first electrically conductive frame 200 may be formed instead from a silicon wafer having a silicide coating. In still further variations, the first electrically conductive frame 200 may include one or more carbonaceous materials, for example, as a coating.

The first active material 202 that is supported by the first electrically conductive frame 200 may be in the form of a paste including, for example, a first electroactive material comprising, for example, lead oxide ($PbO_2$), as well as sulfuric acid and water. In various aspects, the first electroactive material may further include one or more first additives, for example, a carbon additive, a silicon additive, and/or a sulfate additive. For example, carbon additives may improve charge acceptance of the first electroactive material, while silicon additives provides for lighter weight systems and improves chemical stability and sulfate additives provides protection against water loss, as well as over-voltage and over-temperature immunity.

Figure 1C:
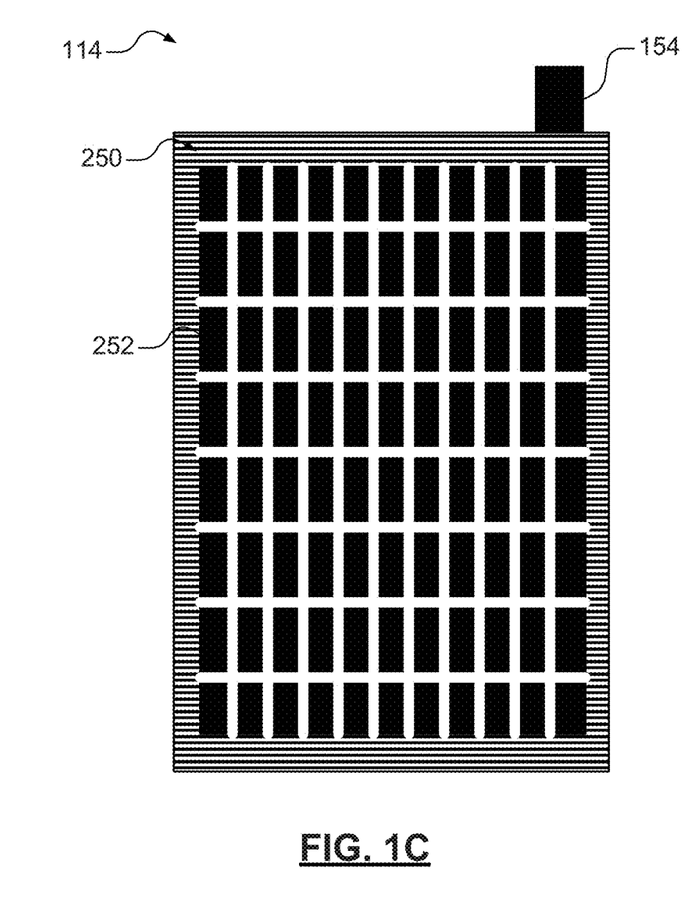
FIG. 1C is an illustration of another example plate for the lead-acid battery illustrated in FIG. 1A.

As illustrated in FIG. 1C, each negative plate 114 includes a second electrically conductive frame 250 and a second or negative active material 252 disposed thereon. Like the first electrically conductive frame 200, the second electrically conductive frame 250, may be a grid lattice having, for example, a honey-comb structure. As illustrated, the second electrically conductive frame 250 may include a second or negative tab 154. As illustrated, the second electrically conductive frames 250 may each include a second or negative tab 154. As seen in FIG. 1A, the second tabs 154 of each of the plurality of negative plates 114 may be electrically connected, and in various aspects, though not shown, the second tab 154 of each of the plurality of negative plates 114 may be in electrical communication with a second or negative battery terminal 164.

The second electrically conductive frame 250 may be the same or different from the first electrically conductive frame 200. For example, the second electrically conductive frame 250 may comprises lead (Pb), and in certain aspects, a lead alloy further comprising one or more additive materials. For example, the second electrical conductive frame 250 may include one or more of antimony (Sb), calcium (Ca), tin (Sn), aluminum (Al), and titanium (Ti). Such additive materials may provide additional mechanical strength to the second electrically conductive frame 250.

The second active material 252 supported by the second electrically conductive frame 250 may be in the form of a paste including, for example, a second electroactive material comprising one or more of, for example, lead (Pb) and lead oxide ($PbO_2$), as well as sulfuric acid and water. In various aspects, like the first electroactive material, the second electroactive material may further include one or more second additives, for example, a carbon additive, a silicon additive, and/or a sulfate additive.

As noted above, the separators 116, as well as the pluralities of stacked plates 112, 114 and the cavity or interior 124 defined by the battery casing 120, may include an electrolyte 130. The electrolyte 130 is an aqueous acid solution comprising, for example, sulfuric acid ($H_2SO_4$) prior to battery formation. In certain variations, the electrolyte 130 may include one or more known electrolyte additives.

The lead-acid battery 100 may generate an electric current during discharge by way of reversible electrochemical reactions. For example, the lead-acid battery 100 may operate by a double sulfate chemical reaction. The sulfuric acid present in the electrolyte 130 may react with both the first and second active materials 202, 252 to form lead sulfate ($PbSO_4$). The battery 100 can be charged or re-energized at any time by connecting an external power source to the battery 100, for example to the battery terminals 162, 164, to reverse the electrochemical reactions that occur during battery discharge. The external power source that may be used to charge the battery 100 may vary depending on the size, construction, and particular end-use of the battery 100. Some notable and exemplary external power sources include, but are not limited to, an AC-DC converter connected to an AC electrical power grid though a wall outlet and a motor vehicle alternator.

During discharge, lead sulfate typically forms in a finely divided, amorphous state (e.g., soft state) that readily reverts during battery recharge. However, as the lead-acid battery 100 cycles through numerous discharges and charges, in particular when the lead-acid battery 100 is insufficiently charged for a long period of time, a portion of the lead sulfate may precipitate or crystallize on surfaces of the plates (e.g., hard state). In various aspects, the present disclosure provides low-power motion mechanisms that agitate or disturb the electrolyte 130 so as to inhibit, and in certain aspects reverse, sulfation and electrolyte stratification in the lead-acid battery 100.

For example, in various aspects, the lead-acid battery 100 may include one or more circulating systems, for example one or more pump systems 170. The one or more pump systems 170 may be configured to disturb or agitate the electrolyte 130. For example, the one or more pump systems 170 may circulate the electrolyte 130 so as to substantially prevent settling (e.g., improve solubility) of the lead sulfate, and in certain aspects, may maintain improved homogeneity in the electrolyte 130. Though not illustrated, the skilled artisan will appreciate that in various aspects, the one or more pump systems 170 may be disposed within the battery casing 120. Similarly, the skilled artisan will appreciate that in the instance lead-acid batteries having, for example, a plurality of individual cells, chambers, and/or compartments, each chamber may be in fluid communication with one or more of the one or more pump systems. For example, a first pump system of the one or more pump may be in communication with one or more first chambers of the plurality of chambers. Similarly, a second pump system of the one or more pump systems may be in communication with one or more second chambers of the plurality of chambers. In each instance, the one or more pump systems may be disposed within the battery casing. In other instances, the one or more circulating systems may be external to the battery casing.

The one or more circulating systems, for example pump systems, may take a variety of configurations. For example, with renewed reference to FIG. 1A, the one or more pump systems 170 may be positive displacement pumps, such as, for example, peristaltic or roller pumps, that circulates electrolyte 130 disposed within the lead-acid battery 100. The one or more pump systems 170 may each comprise a plurality of tubes 172, 174, 178 and one or more rotational or moving members 176 that apply pressure to one or more of the plurality of tubes 172, 174, 178.

For example, as illustrated, one or more tubes 172, 174 may extend between the lead-acid battery 100 and an externally placed pump system 170. For example, a first tube 172 may be an inlet tube that receives a fluid (e.g., electrolyte 130) from the pump system 170. For example, the first tube 172 may carry or transport fluid (e.g., electrolyte 130) from the pump system 170 to the lead-acid battery 100, and in particular, the battery casing 120. A second tube 174 may be an outlet tube that transports the fluid (e.g., electrolyte 130) to the pump system 170. For example, the second tube 174 may carry or transport fluid (e.g., electrolyte 130) from the lead-acid battery 100, and in particular, the battery casing 120. The pump system 170 may further include one or more rotational or moving members 176 that apply pressure to a pump tube 178. The pump tube 178 may be in communication with and/or configured to receive the first and second tubes 172, 174. The moving member 176 may apply pressure to the pump tube 172 so that fluid (e.g., electrolyte 130) is carried or transported from the inlet tube 172 to the outlet tube 174.

In various aspects, the plurality of tubes, including the first and second tubes 172, 174 and the pump tube 178, may each comprise one or more acid resistant materials. For example, the tubes 172 174, 178 may each comprise polytetrafluoroethylene (PTFE) or other acid resistant polymers. In certain variations, the one or more pump systems 170 may be powered electrically using one or more low powered motors. In other variations, the one or more pumps 170 may be operated pneumatically.

As discussed above, the present technology provides methods for creating a flow of fluid containing reactive species in contact with a surface of an active component. In various embodiments, the surface of the active component comprises reactive species (e.g., ionic species) in an electrochemical reaction with reactive species in the fluid. In various aspects, the electrochemical reaction results in concentrations of the reactive species in the fluid that may differ depending on proximity to the surface of the active component. Thus, concentration of species in the fluid are not homogenous, such that the local concentration of species in the fluid at or near the surface of the active component may be higher or lower than the concentration of species at locations farther from the surface of the active component. In various aspects, methods of the present technology create flow in the fluid to alter the local concentration of reactive species which may, in some embodiments, operate to homogenize the concentration of the reactive species in the fluid.

In embodiments where the active component is an electrode in a battery, and the fluid is an electrolyte, methods mix the electrolyte in contact with a surface of the electrode, such as to alter the local concentration of ionic species at the surface of the electrode. For example, by altering the local electrolyte concentration, such methods may lower the concentration of reaction by products at the surface of the electrode. In some aspects, such methods may improve charge acceptance at a positive electrode. As discussed above, in various aspects such methods may reduce deposition of sulfate or aid in removal of sulfate deposits on electrodes in lead-acid batteries.

In various aspects, the present disclosure provides a method for desulfation in a lead-acid battery, for example such as the desulfation of lead-acid battery 100 illustrated in FIG. 1A. The method includes circulating an electrolyte using one or more circulating systems that may be in communication with the lead-acid battery. More specifically, the lead-acid battery may include a control module that receives information, and, in certain instances, stores information, regarding the circulation of the electrolyte, and in certain instances, also the state of charge of the lead-acid battery. For example, the control module may be a variable frequency controller that includes a central processing unit that is in communication with one or more circulating systems, for example such as the one or more pump system 170 illustrated in FIG. 1A.

Figure 2:
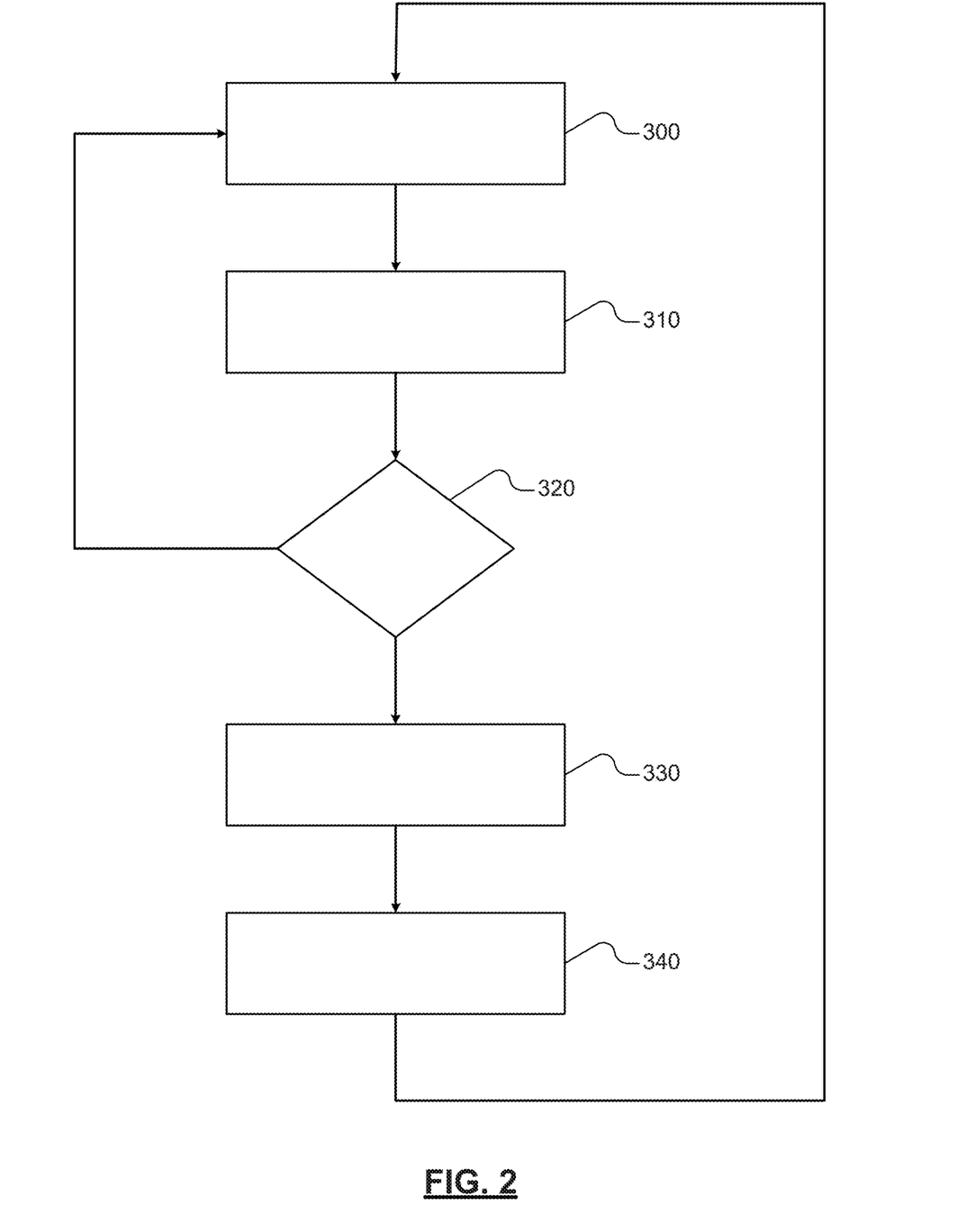
FIG. 2 is an illustration of an example control path for the one or more circulating systems illustrated in FIG. 1A.

The control module may be configured to receive information regarding a last circulation and/or the current state of charge (SOC) and/or temperature—for example, information regarding the time of or since last motion and/or information regarding the current state of charge (SOC) and/or temperature of the system. If a time elapse since the last activation and/or the current state of charge (SOC) and/or temperature is different from (for example, greater than) a predetermined value the control module may again activate the one or more circulating systems and circulation of the electrolyte. The control module may also be configured to reset a timer, for example an internal timer. In various aspects, the internal timer may determine the frequency of control and, in certain instances, may define the time elapse since prior activation. The control module may be configured to circulate the electrolyte by movement of the one or more circulating systems for a predetermined number of cycles of the one or more circulating systems and/or for a predetermined time period. If, instead, the time elapse and/or current state of charge (SOC) and/or temperature is otherwise different from (for example, less than) the predetermined value the control module may maintain a neutral or non-motion state until the time elapse and/or current state of charge (SOC) and/or temperature is again different from (for example, greater than) the predetermined value. For example, FIG. 2 illustrates an example control path.

At method step 300, the control module may receive information regarding the time elapse since the last activation and/or the current state of charge (SOC) and/or temperature of the system. For example, the control module may be configured to determine the time elapse since the last activation using an internal timer. The control module may also be configured to receive information regarding the current state of charge (SOC) and/or temperature of the system, for example, from one or more sensors in communication with the fluid (e.g., electrolyte) and/or energy system (e.g., lead-acid battery). In certain instances, the one or more sensors may also measure flow (e.g., velocity of motion) and the control module may be further configured to receive such information. Similarly, the one or more sensors may also determine the number of cycles elapsed and the control module may be further configured to receive such information.

At method step 310, the control module may be configured to calculate the time elapse since the last activation, the current state of charge (SOC) and/or temperature of the system, the velocity of motion, and/or the number of cycles using the received information. For example, the control module may be configured to determine an activation function that is a function of one or more of the time elapse since the last activation, the current state of charge (SOC) and/or temperature of the system, the velocity of motion, and/or the number of cycles.

At method step 320, the control module may be configured to compare the received and calculated information to one or more predetermined values. If the interested predetermined value or one or more predetermined value is satisfied, the control module may be configured to continue to method step 330. If the interested predetermined value or one or more predetermined value is not satisfied, the control module may be configured to return to method step 300.

At method step 330, the control module may be configured to activate the one or more circulating systems. The control module may be configured to activate the one or more circulating system for a predetermined number of cycles and/or a predetermined time period. Following the predetermined number of cycles and/or a predetermined time period, the control module may be configured, at method step 340, to reset and/or start an internal timer. The internal timer the internal timer may determine the frequency of control and, in certain instances, may define the time elapse since prior activation. After resetting and/or starting the internal timer at method step 340, the control module may be configured to return or start again at method step 300.

In some embodiments, methods of the present technology additionally comprise methods among those known in the art for reducing the formation of sulfate deposits or removing sulfate deposits from electrodes of lead-acid batteries. Such methods may include providing overcharge current to a battery, or application of pulse currents.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A method for desulfation in a lead-acid battery, the method comprising:
    circulating an electrolyte using one or more circulating systems that are in communication with the electrolyte,
    wherein the lead-acid battery comprises one or more electroactive plates disposed within a casing and the electrolyte is disposed within the casing and surrounds the electroactive plates, and
    wherein the lead-acid battery comprises a control module, the control module being configured to actuate the one or more circulating systems for a predetermined number of circulation cycles or a first predetermined time period, and following the actuation and elapse of the first predetermined number of circulation cycles or the first predetermined time period, the control module is configured to maintain the one or more circulating systems in a non-motion state for a second predetermined time period.

2. The method of claim 1, wherein the one or more circulating system are disposed within the casing with the one or more electroactive plates.

3. The method of claim 1, wherein the one or more circulating systems includes one or more peristaltic pumps comprising at least one moving member and at least one pump tube.

4. The method of claim 3, wherein at least one outlet tube carries the electrolyte from the lead-acid battery to the one or more circulating systems and at least one inlet tube carries the electrolyte from the one or more circulating systems to the lead-acid battery.

5. The method of claim 4, wherein the at least one pump tube is in communication with the at least one outlet tube and the at least one inlet tube, and movement of the at least one moving member applies pressure to the at least one pump tube so as to carry the electrolyte from the inlet tube to the outlet tube.

6. The method of claim 4, wherein the at least one outlet tube, the inlet tube, and the pump tube comprises polytetrafluoroethylene (PTFE).

7. The method of claim 1, wherein the one or more circulating systems are electrically powered.

8. The method of claim 1, wherein the one or more circulating systems are pneumatically powered.

9. A energy storage device comprising:
    a battery casing defining a plurality of chambers, each of the plurality of chambers comprising:
        one or more electroactive plates disposed therein, and
        an electrolyte disposed so as to surround the one or more electroactive plates;
    one or more circulating systems configured to agitate the electrolyte in each of the plurality of chambers, and
    a control module configured to actuate the one or more circulating systems for a predetermined number of circulation cycles or a first predetermined time period, and
        following the actuation and elapse of the first predetermined number of circulation cycles or the first predetermined time period, the control module is configured to maintain the one or more circulating systems in a non-motion state for a second predetermined time period.

10. The energy storage device of claim 9, wherein a first circulating system is configured to agitate an electrolyte in a first chamber of the plurality of chambers and a second circulating system is configured to agitate an electrolyte in a second chamber of the plurality of chambers.

11. The energy storage device of claim 9, wherein a first circulating system is configured to agitate an electrolyte in both a first chamber of the plurality of chambers and an electrolyte in a second chamber of the plurality of chambers.

12. The energy storage device of claim 11, wherein the electrolyte in the first chamber of the plurality of chambers is the same as the electrolyte in the second chamber of the plurality of chambers.

13. The energy storage device of claim 11, wherein the electrolyte in the first chamber of the plurality of chambers is different from the electrolyte in the second chamber of the plurality of chambers.

14. The energy storage device of claim 9, wherein the one or more circulating system are disposed within the battery casing.

15. The energy storage device of claim 9, wherein the one or more circulating systems includes one or more peristaltic pumps comprising at least one moving member and at least one pump tube.

16. The energy storage device of claim 15, wherein the energy storage device further includes at least one outlet tube that carries electrolyte from the battery casing to the one or more circulating systems and at least one inlet tube that carries electrolyte from the one or more circulating systems to the battery casing.

17. The energy storage device of claim 16, wherein the at least one pump tube is in communication with the at least one outlet tube and the at least one inlet tube, and movement of the at least one moving member presses the at least one pump tube so as to carry the electrolyte from the inlet tube to the outlet tube.

18. The energy storage device of claim 9, wherein the one or more circulating systems are one of electrically powered and pneumatically powered.

* * * * *